United States Patent
Westman

(10) Patent No.: US 7,801,116 B2
(45) Date of Patent: Sep. 21, 2010

(54) SYSTEM, DEVICE, AND METHOD FOR PROVIDING CALL FORWARDING IN DUAL SUBSCRIPTION MODE

(75) Inventor: Iikka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 275 days.

(21) Appl. No.: 12/213,236

(22) Filed: Jun. 17, 2008

(65) Prior Publication Data

US 2008/0261595 A1   Oct. 23, 2008

Related U.S. Application Data

(62) Division of application No. 10/480,194, filed as application No. PCT/EP01/06975 on Jun. 20, 2001, now Pat. No. 7,403,517.

(51) Int. Cl.
*H04L 12/66* (2006.01)
*H04M 3/42* (2006.01)

(52) U.S. Cl. ............... 370/352; 455/417; 455/432.1; 455/435.1

(58) Field of Classification Search ......... 370/352–356; 455/416–417, 426.1, 432.1, 435.1
See application file for complete search history.

(56) References Cited

U.S. PATENT DOCUMENTS 6,094,578 A * 7/2000 Purcell et al. ............ 455/426.1

2002/0169883 A1 * 11/2002 Bright et al. ............... 709/230

FOREIGN PATENT DOCUMENTS

| EP | 0 948 231 A2 | 10/1999 |
| WO | WO 98/59513 | 12/1998 |
| WO | WO 00/33523 | 6/2000 |
| WO | WO 00/79827 A1 | 12/2000 |

OTHER PUBLICATIONS

Korean Patent Abstracts, XP002902285 & KR 01 017860, Mar. 5, 2001.

* cited by examiner

*Primary Examiner*—Lee Nguyen
(74) *Attorney, Agent, or Firm*—Mintz, Levin, Cohn, Ferris, Glovsky, and Popeo, P.C.

(57) ABSTRACT

A method and system for providing interworking between a first and a second network of different types, preferably an IMS and a CS (Circuit-Switched) network. A call received by the first network and directed to a terminal unregistered from the first network, is forwarded to the second network, whereas when the call is received by the second network and is directed to a terminal unregistered from the second network, the call is not forwarded to the first network. The same identifier, preferably the same E.164 number, is used in both networks for identifying the called terminal. Preferably, the first network is informed on the registration of the terminal to the second network, the first network using this information as basis for the decision whether or not to route a call to the second network.

14 Claims, 4 Drawing Sheets

SYSTEM, DEVICE, AND METHOD FOR PROVIDING CALL FORWARDING IN DUAL SUBSCRIPTION MODE

CROSS REFERENCE TO RELATED APPLICATIONS

This application is a divisional of U.S. patent application Ser. No. 10/480,194 filed on Dec. 10, 2003, which claims priority to PCT Patent Application Serial No. PCT/EP01/06975 filed Jun. 20, 2001. The subject matter of the earlier filed applications is hereby incorporated by reference.

BACKGROUND OF THE INVENTION

The invention relates to a system, device and method for providing call forwarding in dual subscription to different types of networks, e.g. a packet-based and circuit-switched network.

More specifically, the invention relates, according to some of the embodiments, to 3GPP (Third Generation Partnership Project) IP (Internet Protocol) Multimedia network, and to call control, e.g. using a HSS (Home Subscriber Server) or Call Processing Server (CPS).

When considering to enable roaming of a user equipment between networks of different types, e.g. between an IMS (IMS; IP Multimedia Subsystem) and a CS (Circuit-Switched) network, by providing two subscriptions, problems may arise. First, if both subscriptions are unregistered and CS or IMS network receives a call, a forwarding loop may be built: e.g. CS→IMS→CS→IMS→ etc until the network detects and interrupts the loop. Second, if a service such as "Call forwarding on mobile not reachable" contains on both sides (IMS and CS) a routing number to another side, it is not possible to route the call e.g. to voice mail at all in "not reachable" case.

SUMMARY OF THE INVENTION

The present invention provides a system, method and/or device as defined in any of the independent claims or any of the dependent claims.

The invention presents simple and effective solutions for the above discussed dual subscription problem and provides interworking ("roaming") between different types of networks, e.g. IMS (IMS; IP Multimedia Subsystem) and CS (Circuit-Switched) networks, e.g. in a case where the same identifier such as E.164 number is used on both sides.

No changes are needed in CS network, e.g. GSM (Global System for Mobile Communications) and especially in HLR (Home Location Register). The solutions include forwarding only from one network, e.g. IMS, to the other network, e.g. GSM, but not vice versa. The solutions use a synonym of the original number as routing number. In some of the embodiments, the functionality of a mobile terminal is additionally used.

According to one aspect, the invention provides a simple solution to a stand-alone case (HLR and UMS, User Mobility Server, are independent and have no interface between them).

According to one of the preferred implementations of the invention, there is provided a method and/or system for providing interworking between a first and a second network of different types, wherein a terminal can be registered to the first network and/or to the second network, wherein a call received by the first network and directed to a terminal unregistered from the first network, is forwarded to the second network, whereas when the call is received by the second network and is directed to a terminal unregistered from the second network, the call is not forwarded to the first network.

According to another one of the preferred implementations of the invention, there is provided a method and/or system for providing interworking between a first and a second network of different types, wherein a subscriber entity can be registered to the first network and/or to the second network, wherein a call received by the first network and directed to a subscriber entity unregistered from the first network, can be forwarded to the second network, the said forwarding step comprises the following steps: issuing an enquiry to service execution means, the said enquiry carrying call characteristics, the said service execution means arranged to be aware of the conversion capabilities of a gateway means providing media stream conversion between said first and second network, the said service execution means inspecting call characteristics, the said service execution means making a decision as to whether the call characteristics are such that at least one media stream related to the call can be converted by the said gateway means, issuing from the said service execution means a forwarding request to the second network based on the said decision.

The subscriber entity may be a SIM or USIM card or other subscription information associated or attachable to a mobile equipment at a given moment in time.

According to another one of the preferred implementations of the invention, there is provided a method and/or system for providing interworking between a first and a second network of different types, wherein a terminal can be registered to the first network and/or to the second network, wherein a session request received by the first network and directed to a terminal unregistered from the first network, is forwarded to the second network together with an information indicating that the session request was forwarded from the first network.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Reference will now be made in detail to preferred embodiments of the present invention, examples of which are illustrated in the accompanying drawings.

Basically, the invention provides a configurable system and method for dual subscription to different types of networks, e.g. a packet-based, e.g. IP-based, and a circuit-switched network. The embodiments relate to dual subscription to two networks of different types, i.e. network interworking such as IMS-CS interworking.

Figure 1:
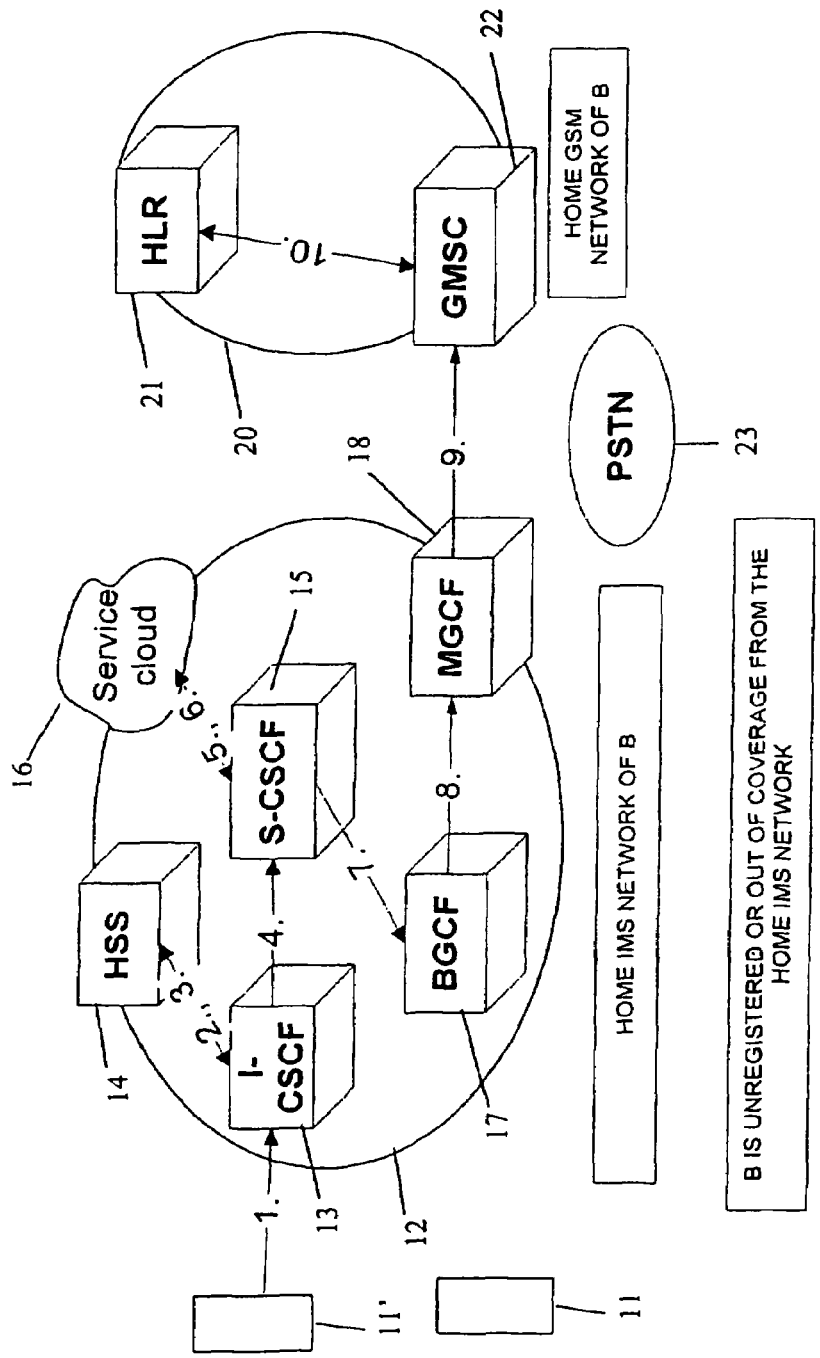
FIG. 1 illustrates a basic structure of a communication system in accordance with an embodiment of the invention.
Figure 2:
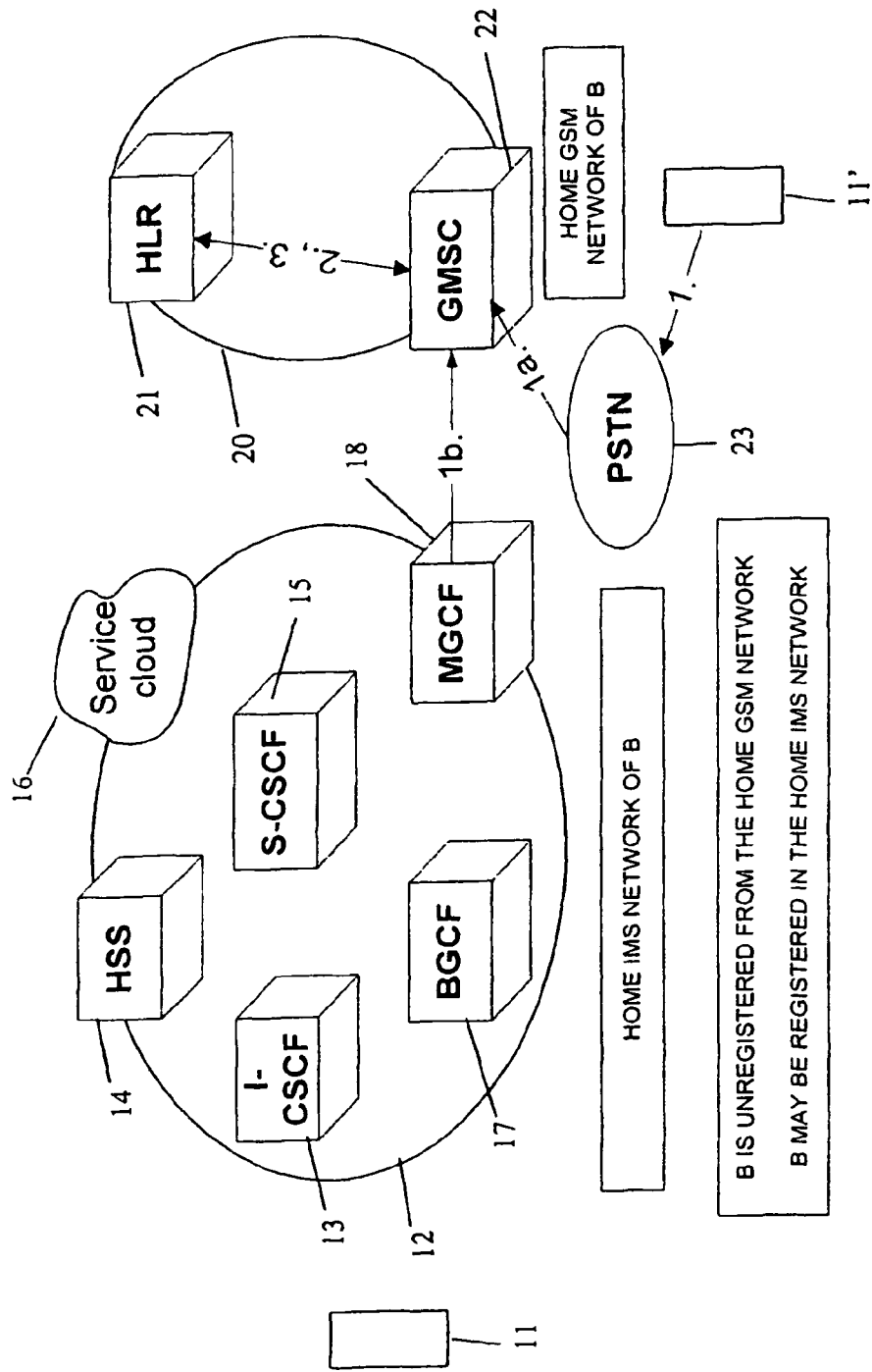
FIG. 2 shows an alternative message flow in the embodiment of the invention.

Both embodiments according to FIGS. 1 and 2 provide call or message forwarding only to one direction, that is from one network to another network of another type, but not vice versa. Some embodiments additionally implement the forwarding only to one direction with the help of a dual-mode terminal that can register into at least two different types of network e.g. IMS and GSM.

FIG. 1 illustrates a first embodiment of the invention which includes a user equipment 11, e.g. a mobile terminal such as a cellular phone or portable computer which is registrable and attachable to a first network 12, preferably a packet-based network such as an IMS (IP Multimedia Subsystem) network. The IMS network 12 is the home IP network of the subscriber B of terminal 11.

The network 12 comprises an I-CSCF (Interrogating Call State Control Function) 13, a HSS (Home Subscriber Server) 14, an S-CSCF (Serving Call State Control Function) 15, a service entity sometimes also termed service cloud 16 which can be a system, method, device, and/or server or alike that can offer services, a BGCF (Breakout Gateway Control Function) 17, and a MGCF (Media Gateway Control Function) 18.

The entity 16 can be an Application Execution Environment (AExE) which receives, from S-CSCF 15, information on the session or call characteristics such as Quality of Service (QoS), admissible delay, jitter, etc. More generally, the session characteristics are a so-called session description describing the session parameters such as the ones mentioned above, and/or defining the session to be a video call which may contain video stream and audio stream, an audio call, a stereo audio call etc. The session characteristics may also contain a session description defining the type of coding such as audio coding AMR.

The terminal 11 may additionally or alternatively be registrable or attachable to a GSM network 20 which includes a HLR (Home Location Register) 21 and a GMSC (Gateway Mobile services Switching Center) 22. In the shown case, the GSM network 20 is the home GSM network of the subscriber B of terminal 11. Further, a PSTN (Public Switched Telephone Network) 23 is shown in FIG. 1.

The embodiments according to the invention present several implementations described below which may be provided alternatively or cumulatively.

In the case of FIG. 1, the subscriber B, i.e. the terminal 11, is unregistered, or out of coverage, from the home IMS network 12, and a call to terminal 11 received by IMS network 12 is forwarded to GSM network 20.

According to a specific embodiment, when the IMS subscription of terminal 11 is unregistered or the terminal 11 is out of coverage, and the IMS network 12 receives a call to terminal 11, the call is routed to GSM network 20 only when the IMS network 12 deduces of information available that the user might be registered in GSM network 20.

According to another implementation of the invention, the mobile terminal 11 knows after every location update that it is registered in GSM network 20. This information can e.g. be transported, for instance after every location update, to the IMS network 12, where it is used as the basis for the decision whether or not to route the call to GSM network 20 if the terminal 11 loses coverage or becomes unregistered from IMS network 12.

According to a further implementation, a new service is provided in IMS network 12 that could be called for instance: "Conditional session forwarding on mobile not reachable".

Further, for routing a call from IMS network 12 to GSM network 20, a routing number, which is a synonym of the original identifier of the subscriber B, is used to route the call from IMS to GSM. The original identifier is e.g. an E.164 number or a logical name like john.smith@ims.sonera.fi. The synonym may or may not be the same as the original E.164 identifier or part of the original E.164.

Note that an E.164 number is a number identifying a called party or terminal and being structured in accordance with the standard ITU-T Rec. E.164 (international public telecommunication numbering plan). An E.164 number typically consists of three fields, CC (country code), NDC (national destination code), and SN (subscriber number).

In each of the above implementations, when the GSM subscription of terminal 11 is unregistered or the terminal 11 is out of coverage in GSM network, and the GSM network 20 receives a call to terminal 11, the call is not routed to IMS network 12.

The embodiment shown in FIG. 1 illustrates a case in which the terminal 11, i.e. subscriber B, is unregistered from IMS 12, and a call is possibly forwarded from IMS network 12 to GSM network 20. In this embodiment, an E.164 (that is an IMS and GSM number) number is used as identifier for calling a terminal.

In step 1, a call setup message, e.g. an INVITE message of SIP (Session Initiation Protocol), is sent from a terminal 11' to I-CSCF 13 for setting up a call to terminal 11. The call setup message indicates an identifier for identifying terminal 11, e.g 358401223344@ims.sonera.fi indicating the E.164 number of terminal 11.

Step 2: The I-CSCF 13 sends a Location request to HSS 14 including the identifier of terminal 11, e.g. 358401223344@ims.sonera.fi.

Step 3: Because the subscriber is not registered in IMS, the HSS 14 indicates this fact to the I-CSCF 13, and may or may not assign a S-CSCF to the call.

Step 4: The I-CSCF 13 chooses a S-CSCF 15 for the call if the HSS did not assign it and sends a message to S-CSCF 15, e.g. an INVITE message with the identifier 358401223344@ims.sonera.fi.

Step 5: S-CSCF 15 makes a query to the service cloud 16 with the original number or with a number fetched from the subscriber's profile and asks for the service "Session forwarding on mobile not reachable".

Step 6: The service cloud 16 returns a number that is a synonym of the original identifier, i.e. number, e.g. 358491223344. This synonym number is appropriate as a GSM number and is used as routing number.

Step 7: S-CSCF 15 sends a message, e.g. an INVITE message, to BGCF 17 and indicates the routing number 358491223344 in the INVITE message.

Step 8: The BGCF 17 chooses the correct MGCF 18 and sends the INVITE message to MGCF 18 indicating the routing number. MGCF 18 translates the synonym i.e. the routing number to the original E.164 number i.e. 358401223344 if the original E.164 identifier is not conveyed to MGCF.

Step 9: The MGCF 18 sends a setup request to GMSC 22 indicating the E.164 number 358401223344.

Step 10: GMSC 22 sends a Location request to HLR 21 with 358401223344. The HLR 21 returns, if available, the requested information.

When the terminal 11 can be reached, the call is setup to terminal 11, otherwise, the call is handled normally as a call to an unregistered subscriber.

In the following, an alternative functioning of the embodiment of FIG. 1 is described wherein another identifier for identifying a called subscriber/terminal is used. In this example, a Universal Resource Locator (URL) such as SIP-URL is used. The step numbering shown in FIG. 1 applies to this embodiment as well.

Step 1: A call setup request message such as an INVITE message of SIP is sent from a call originating terminal 11' to network 12, the message including the identifier e.g. john.smith@ims.sonera.fi of the called terminal.

Step 2: I-CSCF 13 sends a Location request to HSS 14 which request includes the identifier john.smith@ims.sonera.fi.

Step 3: Because the subscriber is not registered in IMS network 12, the I-CSCF 13 is informed thereon, and S-CSCF may or may not be assigned to the subscriber. I-CSCF 13 then chooses itself a S-CSCF 15 for the call if the HSS did not assign it.

Step 4: I-CSCF 14 sends an INVITE message to the selected S-CSCF 15 with john.smith@ims.sonera.fi.

Step 5: S-CSCF 15 makes a query to the service cloud 16 indicating the identifier john.smith@ims.sonera.fi or a number fetched from the subscriber's profile and asking for the service "Session forwarding on mobile not reachable".

Step 6: The service cloud 16 returns a number that is a synonym of the original identifier and preferably is the E.164 number, e.g. 358491223344. This synonym number is appropriate as a GSM number and is used as routing number.

Steps 7 to 10 are similar to the above described steps 7 to 10.

In these or other embodiments, a new service like "Voice call forwarding on mobile not reachable" or "Conditional session forwarding on mobile not reachable" is provided. In this embodiment, one of the components of the IMS network 12, e.g. S-CSCF 15, or preferably the AEXE 16, checks at least QoS (Quality of Service) requirements e.g. whether the connection request to terminal 11 is for instance a voice call request or another request type, e.g. packet-based connection or data connection. A session forwarding service is continued only when detecting, in this checking step, that the requested connection has such QoS requirements (e.g. voice call) that it can be routed to CS network. This ensures that only those sessions that can successfully be forwarded to GSM (at least QoS is preferably checked), are actually forwarded to GSM.

FIG. 2 shows a case where the subscriber B, i.e. the called terminal 11 is unregistered from the home GSM network 20, and a call to terminal 11 is not forwarded from GSM network 20 to the packet-based network, e.g. home IMS network 12 even when B should be registered in the home IMS network 12.

In this case, an E.164 number (that is an IMS and GSM number) is sent from the call originating terminal 11' for identifying B.

In a step 1a, a setup request may be issued from PSTN 23 to GMSC 22 indicating the identifier, e.g. E.164 number, i.e. +358-40-1223344.

Alternatively, in a step 1b: A setup request indicating the E.164 number of the called terminal 11, e.g. +358-40-1223344, is sent from network 12, i.e. from MGCF 18, to GSM network 20 because the user is unregistered in IMS network 12.

Step 2: The GMSC 22 sends a Location request to HLR 21 with +358-40-1223344.

Step 3: Because the subscriber is not registered in GSM, HLR 21 returns, if available, a "Call forwarding on mobile not reachable" number that is a number e.g. to voice mail. The call is then directed to the voice mail. Otherwise, the call is released.

The described embodiments have the advantages of simple structure, and do not require changes of the GSM network. In particular when the GSM subscription is the primary subscription for the user, i.e. the user normally is not registered only in IMS but also in GSM, the greatest part of the calls will be successfully routed.

According to one of the aspects of the invention, when the S-CSCF 15 in the user's home core network such as network 12 receives a session set-up request including the session or call characteristics, it sends this request or at least a request including the session characteristics to the entity (e.g. AExE) 16 which checks, at least when the terminating terminal is unregistered from network 12, the session characteristics for deciding whether or not this session can be routed, i.e. forwarded to the CS-network 20. As an example the entity 16 checks whether the media gateway 18 is able to translate the traffic content of the requested session to a form appropriate for forwarding it to the CS network 20. E.g. the audio/speech coding like AMR of the session to be set-up, and the possibility of the media gateway to convert the speech coding to PCM coding suitable for network 20, is checked by entity 16. If no proper conversion is available, the entity 16 decides not to forward the session, and informs the CSCF 15 to release the session.

Generally speaking, the network 12, e.g. entity 16, inspects, at least when the terminal 11 is unregistered from the network 12, the session characteristics for checking the possibility of successfully forwarding the session to the CS network 20 after properly converting the session traffic or signalling in the media gateway 18. When detecting an impossibility of proper conversion, e.g. Stereo Audio to PCM (mono) audio, the session is released without forwarding it.

When the network 12, e.g. entity 16, detects that the session, e.g. a video call or video stream can not be successfully routed to CS network 20, the network 12, e.g. entity 16, can directly route such a session to an appropriate entity such as a Video Mail System when the terminating terminal 11 is unavailable.

As an alternative, the network 12 can be structured to route a session directed to an unregistered terminal 11 directly from S-CSCF 15 to the media gateway 18. Only when the gateway 18 returns an error message to the S-CSCF 15 because of lack of conversion of the traffic and/or signalling, the S-CSCF 15 addresses entity 16 and requests a decision as to how to further proceed with the requested session. The entity 16 then analyzes the session characteristics and instructs the network 12, e.g. CSCF 15, to forward, if possible, the session e.g. to an appropriate mail system such as video mail system.

The interface between S-CSCF 15 and entity 16 can be or use SIP+ or can be implemented as a Service Control Point (SCP).

In a preferred embodiment which may include the above mentioned features, the terminal 11 is a dual-mode terminal. This embodiment is explained with regard to FIGS. 1, 2 again.

In this embodiment, when the IMS subscription of the called party is unregistered, and the IMS network receives a call to this party, the call is routed to GSM network only when the network deduces of the information available that the user might be registered in GSM and QoS (Quality of Service) requirement of the call is suitable for successful routing to GSM.

However, when the GSM subscription of terminal 11 is unregistered, and the GSM network receives a call for terminal 11, the call is not routed to the IMS network.

Alternatively, or additionally, the mobile terminal knows after every location update that it is registered in GSM. This information is transported for instance after every location update to IMS network, where it is used as the basis for the decision whether or not to route the call to GSM if the terminal loses coverage or becomes unregistered from the IMS network. A new service is provided in IMS: "Conditional session forwarding on mobile not reachable".

In the present case, when B is unregistered from IMS, a call is possibly forwarded to GSM. The routing number preferably is a synonym of the original identifier and is used to route the call from IMS to GSM. In this implementation, the E.164 number (that is an IMS and GSM number) is used as identifier of the call terminating terminal 11'.

Steps 1 to 4 of this embodiment are identical to the steps defined above with regard to the E.164 number embodiment.

Step 5: S-CSCF 15 checks QoS (Quality of Service) requirements of the call whether the call is a voice call or other type of call that can be successfully routed to GSM and makes a query to the service cloud 16 with the original number or with a number fetched from the subscriber's profile asking "Conditional session forwarding on mobile not reachable".

Step 6: The service cloud 16 returns, if available, a number that is a synonym of the original identifier, e.g. 358491223344. This synonym number is used as routing number.

S-CSCF 15 checks the information available in order to deduce whether the subscriber is registered in GSM. If this is not the case, the S-CSCF 15 makes a further query to the service cloud with the original identifier asking "Session forwarding on mobile not reachable" and routes the session to the received destination, e.g. to voice mail.

If the subscriber is registered in GSM, the process goes to the next steps 7 and following as described above.

In this embodiment, information is provided for IMS about terminal registration in GSM in one or more of the following manners.

A. After each successful location update the dual terminal sends a message/information to the IMS network 12. The IMS network records the time of the successful location update in GSM e.g. "registered in GSM at 999999".

B. When the user switches off his dual terminal, the terminal sends a message/information to the IMS network 12 indicating that it is switched off. The IMS network records the state "switched off" i.e. "unregistered from GSM".

C. When the user unregisters from the GSM network, the dual terminal sends a message/information to IMS network 12 that it will unregister from GSM. The IMS network 12 records the state "unregistered from GSM".

D. Valid information about registration in GSM is continuously available in HSS 14.

The user may prevent sending message/information of unregistration from GSM and/or switching off the terminal if he e.g. is going to roam to a district, country or alike where IMS network is not available. This may happen e.g. when the user switches off his terminal before boarding an airplane and he knows that in the destination only GSM network is available.

This information is preferably used as follows.

When the terminal is not registered in IMS, it is checked whether the terminal is registered in GSM. The information gathered from the terminal is utilized. At least the following alternative rules may be followed according to the operator's preferences:

A rule 1 can be: If the terminal is "unregistered from GSM", the call is not forwarded to GSM, otherwise it is.

A rule 2 may be: If the terminal is "registered in GSM at 999999" and the time elapsed since that registration time is not longer than a certain period, the call is forwarded to GSM, otherwise it is not.

An additional advantage of this solution, in particular compared to the above discussed solution, is that the user can decide very simply whether voice calls are forwarded from IMS to GSM. If he switches off the terminal or unregisters from GSM, the calls are not forwarded to GSM; if he unregisters from IMS or is outside radio coverage from IMS the calls are forwarded to GSM.

Some functionality is provided in IMS to keep the information about registration in GSM.

Figure 3:
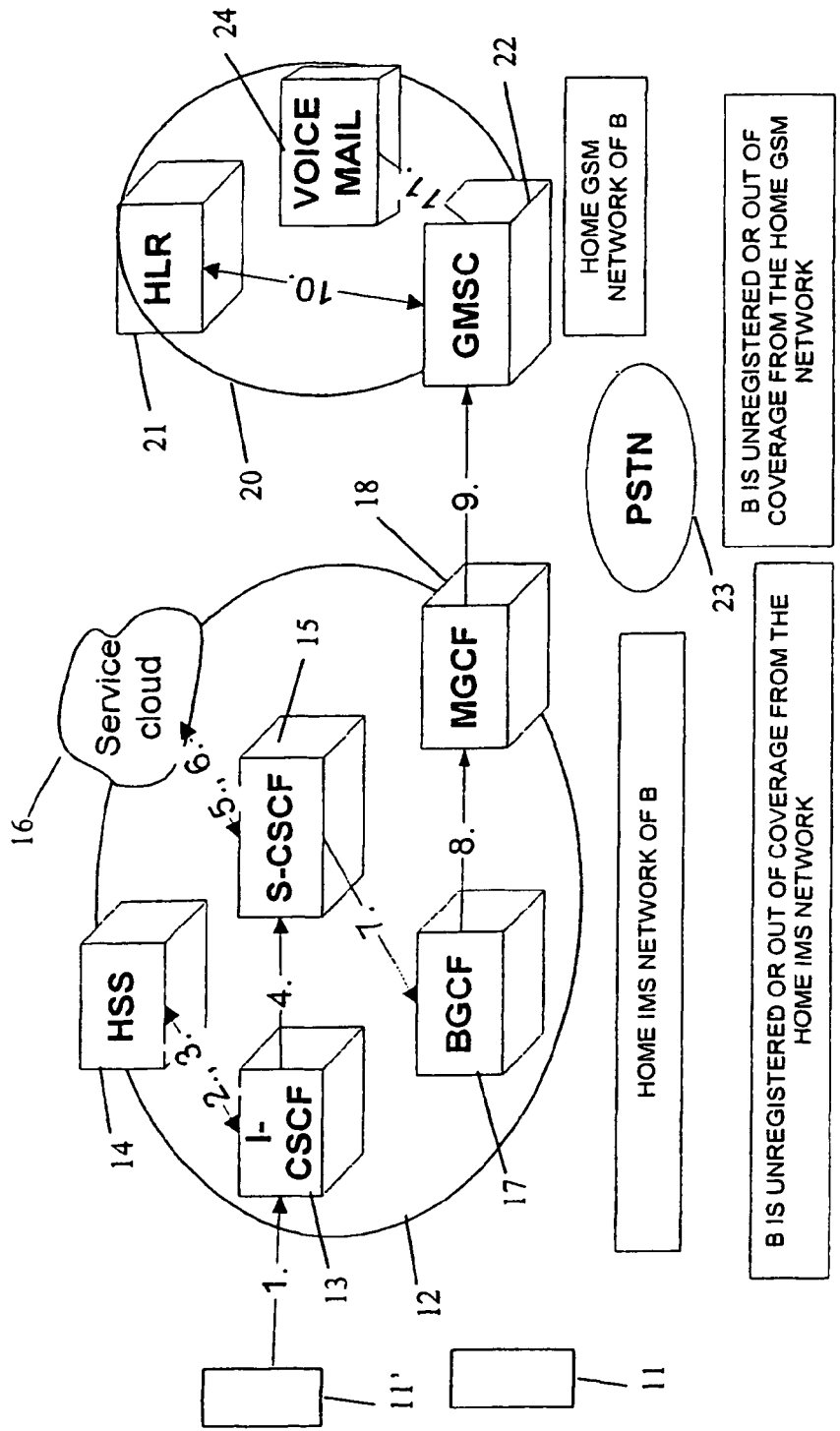
FIG. 3 illustrates a basic structure of a communication system in accordance with another embodiment of the invention.
Figure 4:
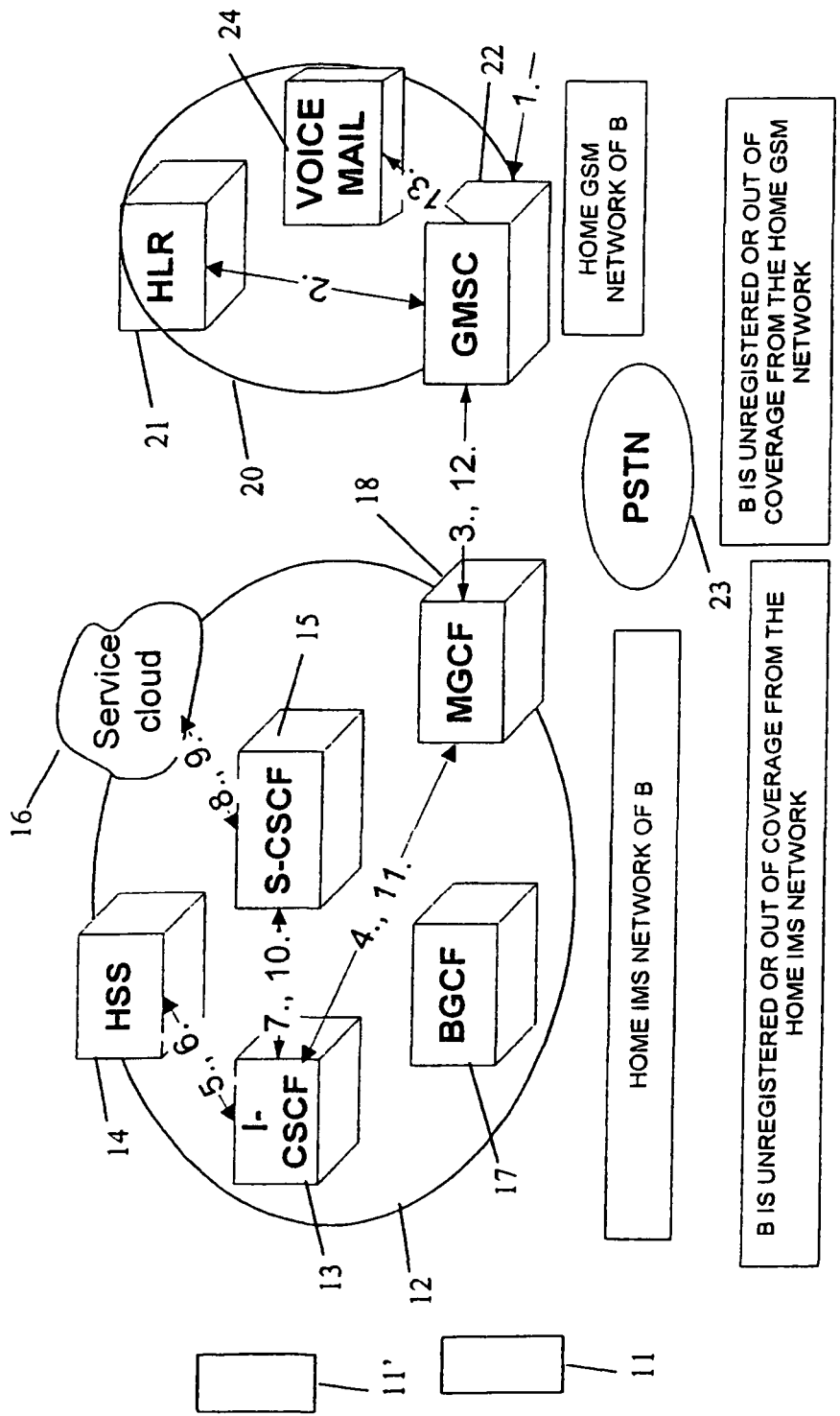
FIG. 4 shows an alternative message flow in the embodiment of the invention.

FIGS. 3, 4 show further embodiments where a session, e.g. a call is forwarded to both directions, i.e. from network 12 to network 20, or from network 20 to network 12.

The functionality of CS network 20 is not changed i.e. the IMS network 12 works together with a GSM network of customary structure. The same identifier, e.g. the same E.164 number identifies the subscription in IMS and GSM. A dual terminal may be used.

According to some aspects of these embodiments, when the IMS subscription is unregistered, and the network 12 receives a session request, e.g. a call, the session is routed to GSM network 20. When the GSM subscription is unregistered, and the network 20 receives a session request, e.g. a call, the session is routed to IMS network 12. A routing number or identifier, which may be a synonym of the original E.164, is used to route the session from IMS 12 to GSM network 20. A routing number or identifier, which may be another synonym of the original E.164, is used to route the session from GSM 20 to IMS 12 network.

The functionality at I-CSCF 13 in IMS network 12 is as follows.

1) Do the UMS query always with the original identifier, e.g. the original E.164, and translate, if needed, the identifier, e.g. E.164 from synonym (i.e. the routing number) to the original identifier, e.g. E.164.

2) If the subscriber is registered in UMS, route the session, e.g. call, to the correct S-CSCF 15.

3) If the subscriber is unregistered in UMS, choose a S-CSCF and route the session there with information that the subscriber is unregistered.

The functionality at S-CSCF 15 in IMS network 12 is as follows.

1) If the subscriber is registered in UMS, translate the identifier, e.g. E.164 to the original one when needed, consult the service cloud 16 and route the session, e.g. call according to the given advice, normally to the subscriber.

2) If the subscriber is unregistered in UMS:

if the E.164 is the original E.164 (i.e. the session e.g. call is not coming from GSM network 20) and the QoS of the session is such that the session can be routed or is reasonable to route to GSM, translate the E.164 to a GSM synonym number and forward the call to GSM 20 with it.

The service cloud need not be consulted. If it is consulted, the advice "Session forwarding on mobile not reachable" is not followed.

if the identifier, e.g. E.164, is the IMS synonym number (i.e. the session e.g. call is coming from GSM network 20), translate the identifier when needed, e.g. E.164 to the original number, consult the service cloud and follow the advice "Session forwarding on mobile not reachable" if available, or release the call if no advice is available.

3) If the call is released and the E.164 is the GSM synonym number i.e. the GSM network 20 releases the call (because e.g. the subscriber is unregistered in GSM), translate the E.164 to the original number when needed, consult the service cloud 16 and follow the advice "Session forwarding on mobile not reachable" if available, or release the call if no advice is available.

The functionality at GMSC 22 in CS network 20 is as follows:

1) Do the HLR 21 query always with the original identifier, e.g. E.164.

Translate the E.164 from synonym (i.e. the routing number) to the original E.164 if needed.

2) If the subscriber is registered in HLR 21, translate the E.164 to the original number when needed and route the session with the routing number received from HLR 21.

3) If the subscriber is unregistered in HLR 21:

if the identifier, e.g. E.164 is the original identifier, e.g. E.164 (i.e. the session is not coming from IMS 12), translate the identifier to the IMS synonym number and forward the call to IMS 12 with this synonym number. Possible advice "Call forwarding on mobile not reachable" from IN, Intelligent Network, (or somewhere else) is not followed.

if the identifier, e.g. E.164, is the GSM synonym number (i.e. the call is coming from IMS 12), translate the identifier to the original number when needed, possibly consult IN (or possibly some other information source) and follow the advice "Call forwarding on mobile not reachable" if available, or release the session if no advice is available.

4) If the session is released and the identifier, e.g. E.164 is the IMS synonym number i.e. the IMS network 12 releases the session (because e.g. the subscriber is unregistered in IMS 12), translate the identifier to the original number when needed, possibly consult IN (or possibly some other information source) and follow the advice "Call forwarding on mobile not reachable" if available, or release the session if no advice is available.

Advantages of these solutions according to FIGS. 3, 4 are:
a) Quite simple,
b) No changes to GSM network needed, only routing has to be slightly reconfigured,
c) Offers the possibility to prioritize one of the networks according to the subscriber's preferences, e.g. have voice mail only in GSM 12 and not on both networks.

In the examples according to FIGS. 3, 4:

the original identifier is the E.164 number: 358-40-1223344 the GSM synonym is: 358-49-1223344 the IMS synonym is: 358-48-1223344

FQDN of the operator's IMS: ims.sonera.fi.

The embodiment shown in FIGS. 3 and 4 comprises the structural components as shown and described with regard to FIGS. 1, 2, and additionally a voice mail component/device or function 24.

First, the functioning of this embodiment will be explained with reference to the arrow numbering of FIG. 3, and the use of an identifier which is the E.164 number (that is an IMS and GSM number).

Step 1: INVITE message to I-CSCF 13 from calling terminal 11' with identifier 358401223344@ims.sonera.fi.

Step 2: Location request to HSS 14 with 358401223344@ims.sonera.fi.

Step 3: Because the subscriber is not registered in IMS, HSS 14 does not assign a S-CSCF to the session, e.g. call. The I-CSCF 13 chooses a S-CSCF 15 for the session.

Step 4: INVITE message to the selected S-CSCF 15 with 358401223344@ims.sonera.fi and with information that the subscriber is unregistered in the IMS network 12.

Step 5: The S-CSCF 15 may make a query to the service cloud 16 with the original identifier 358401223344@ims.sonera.fi.

Step 6: The service cloud 16 may return advice "Session forwarding on mobile not reachable". The advice is not followed. The GSM synonym 358-49-1223344 is generated by S-CSCF 15 from the original identifier, E.164.

Step 7: S-CSCF 15 sends an INVITE message further to BGCF 17 with the GSM synonym +358-49-1223344.

Step 8: BGCF 17 chooses the correct MGCF 18 and sends an INVITE message to it.

Step 9: MGCF 18 sends a setup request to GMSC 22 with the GSM identifier +358-49-1223344.

Step 10: A Location request indicating +358-40-1223344 (i.e. the original E.164) is generated by GMSC 22 and sent to HLR 21. Because the subscriber is unregistered in HLR 21, an IN (or some other information source) is consulted, and the advice "Call forwarding on mobile not reachable" is followed if available, otherwise the session is released.

Step 11: The session is routed e.g. to voice mail 24 with the original E.164.

The solution can also incorporate, in IMS network 12, a service like "Voice call forwarding on mobile not reachable". Then only those calls that can be forwarded to GSM 20 (at least QoS is checked) are forwarded there.

When the identifier used in the embodiment of FIG. 3 is e.g. SIP-URL instead of E.164 number, the following steps may be performed:

Step 1: INVITE to I-CSCF 13 with john.smith@ims.sonera.fi.

Step 2: Location request from I-CSCF 13 to HSS 14 with john.smith@ims.sonera.fi.

Step 3: Because the subscriber is not registered in IMS, no S-CSCF 15 is assigned to the subscriber. HSS 14 returns the original E.164 number to I-CSCF 13. I-CSCF 13 chooses a S-CSCF 15 for the session.

Steps 4-11 are like above except in the step 4 and/or 5 the S-CSCF fetches the original E.164 number from the subscriber's profile if HSS did not returned it.

The embodiment of FIG. 4 illustrates the method flow in case of receiving a session request by the network 20. First, a case is explained when the used identifier is the E.164 number (that is an IMS and GSM number).

Step 1: A Setup request is sent to GMSC 22 from a calling terminal 11' with identifier +358-40-1223344.

Step 2: A Location request with this identifier +358-40-1223344 (i.e. with the original E.164) is sent from GMSC 22 to HLR 21. The called subscriber is unregistered in HLR 21. Because the identifier E.164 is the original number, it is translated by GMSC 22 or HLR 21 to IMS synonym i.e. +358-48-1223344.

Step 3: GMSC 22 sends a Setup request to MGCF 18 indicating the identifier 358-48-1223344.

Step 4: MGCF 18 sends an INVITE message to I-CSCF 13 with identifier 358-48-1223344@ims.sonera.fi which is generated by MGCF 18 based on the received identifier 358-48-1223344 and the IMS identifier ims.sonera.fi.

Step 5: I-CSCF 13 generates an identifier 358401223344@ims.sonera.fi (i.e. with the original E.164) and sends a Location request to HSS 14 with this identifier 358401223344@ims.sonera.fi.

Step 6: Because the subscriber is not registered in IMS, no S-CSCF 15 is assigned from HSS 14 to the session. I-CSCF 13 chooses a S-CSCF 15 for the session.

Step 7: I-CSCF 13 sends an INVITE message to the selected S-CSCF 15 with the IMS identifier 358481223344@ims.sonera.fi and with information that the subscriber is unregistered.

Step 8: S-CSCF 15 makes a query to the service cloud 16 with the original number 358-40-1223344 generated by S-CSCF 15 based on the identifier received from I-CSCF 13.

Step 9: The service cloud 16 may return advice "Session forwarding on mobile not reachable". If the advice is returned, it is followed. Otherwise the call is released. In this example the call is released.

Step 10: A Release command is sent from S-CSCF 15 to I-CSCF 13 for releasing the session 358481223344@ims.sonera.fi.

Step 11: A Release command including the identifier 358481223344@ims.sonera.fi is sent from I-CSCF 13 to MGCF 18.

Step 12: A Release command including the identifier 358-48-1223344 is sent from MGCF 18 to GMSC 22. GMSC 22 checks and detects that the call is released and the E.164 is the IMS synonym number. GMSC 22 translates the E.164 to the original number, possibly consults IN (or possibly some other information source) and follows the advice "Call forwarding on mobile not reachable" if available, or release the call if no advice is available. In this example the advice is to route the call to voice mail.

Step 13: The call is routed with 358-40-1223344 to voice mail 24.

In the above embodiments, the functionality of CS network is not changed i.e. the IMS works together with any customary type of GSM network. Further, the same identifier, e.g. the E.164 number, identifies the subscription in both networks, e.g. IMS and GSM. A dual-mode terminal (Dual terminal) is used which can register to IMS and GSM.

The invention can be implemented to support also other technologies or networks than IMS and GSM. The concept "registered in GSM" means attached in GSM while the concept "unregistered in GSM" means detached from GSM. The names "Session forwarding on mobile not reachable", "Call forwarding on mobile not reachable", "Conditional session forwarding on mobile not reachable", "Voice call forwarding on mobile not reachable", and alike should not be considered as exact names but descriptive names of service, functionality, functional procedure or alike.

Although the invention has been described above with reference to specific embodiments, the scope of the invention also covers any alterations, additions, modifications, and omissions of the disclosed features.

The invention claimed is:

1. A method, comprising:
   forwarding a call received by a first network and directed to a dual-mode mobile terminal unregistered from the first network to a second network,
   wherein the forwarding comprises issuing an inquiry to a service execution processor,
   wherein the inquiry carries call characteristics,
   wherein the service execution processor is configured to be aware of conversion capabilities of a gateway providing media stream conversion between the first network and the second network,
   wherein the service execution processor is further configured to inspect the call characteristics,
   wherein the service execution processor is further configured to decide whether the call characteristics provide for conversion of at least one media stream associated with the call by the gateway,
   wherein the service execution processor is further configured to issue a forwarding request to the second network based on the decision,
   wherein the first network and the second network are different types,
   and wherein the first network and the second network are each configured to register the dual-mode mobile terminal.

2. The method of claim 1, wherein the forwarding further comprises using an identifier configured to be used in both the first network and the second network to identify a called terminal.

3. The method of claim 1, further comprising:
   informing the first network of a registration of the dual-mode mobile terminal to the second network,
   wherein the first network is configured to use the information as a basis for a decision whether or not to route the call to the second network.

4. The method of claim 1, further comprising:
   sending a message to the first network from the second network after a location update in the second network,
   wherein the first network is configured to record a time of the location update.

5. The method of claim 1, further comprising:
   sending a message to the first network when the dual-mode mobile terminal is switched off,
   wherein the message indicates a switching off and unregistering of the first network from the second network, and
   wherein the first network is configured to record an unregistered state.

6. The method of claim 1, further comprising:
   sending a message to the first network that the dual-mode mobile terminal will unregister form the second network,
   wherein the first network is configured to record an unregistered state.

7. The method of claim 1, further comprising:
   checking whether the dual-mode mobile terminal is registered in the second network when the dual-mode mobile terminal is not registered in the first network.

8. The method of claim 1, further comprising:
   checking a time duration elapsed since a time point of registration of the dual-mode mobile terminal to the second network; and
   forwarding the call to the second network when the time duration is shorter than a certain period, otherwise the call is not forwarded.

9. A system, comprising:
   a controller; and
   a service execution processor,
   wherein the controller is configured to forward a call received by a first network and directed to a subscriber entity unregistered from the first network to a second network, and to issue an inquiry to the service execution processor,
   wherein the inquiry carries call characteristics,
   wherein the service execution processor is configured to be aware of conversion capabilities of a gateway providing media stream conversion between the first network and the second network, inspect the call characteristics, decide whether the call characteristics provide for conversion of at least one media stream associated with the call by the gateway, and issue a forwarding request to the second network based on the decision,
   wherein the first network and the second network are of different types, and
   wherein the subscriber entity is configured to be registrable to the first network and the second network.

10. The system of claim 9, wherein the controller is further configured to use an identifier to identify a called subscriber entity.

11. The system of claim 9, wherein the first network is configured to check whether the call directed to the subscriber entity is a call that can be successfully routed to the second network, and wherein the controller is further configured to forward only when detecting that the call can be successfully routed to the second network.

12. The system of claim 9, wherein after each successful location update in the second network, the subscriber entity is further configured to send a message to the first network, and wherein the first network is configured to record a time of the successful location update.

13. The system of claim 9, wherein the subscriber entity is further configured to send, when the subscriber entity is switched off, a message to the first network indicating a switching-off, and wherein the first network is further configured to record an unregistered state.

14. The system of claim 9, wherein the subscriber entity is further configured to send, when the subscriber entity unregisters from the second network, a message to the first network indicating the subscriber entity will unregister from the second network, and wherein the first network is further configured to record an unregistered state.

* * * * *